US012673501B2

(12) United States Patent
Yatsuda

(10) Patent No.: US 12,673,501 B2
(45) Date of Patent: Jul. 7, 2026

(54) LIQUID EJECTION DEVICE

(71) Applicant: SEIKO EPSON CORPORATION, Tokyo (JP)

(72) Inventor: Ryuya Yatsuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/592,626

(22) Filed: Mar. 1, 2024

(65) Prior Publication Data

US 2024/0294015 A1 Sep. 5, 2024

(30) Foreign Application Priority Data

Mar. 2, 2023 (JP) ................................ 2023-031673

(51) Int. Cl.
*B41J 2/175* (2006.01)

(52) U.S. Cl.
CPC ................................ *B41J 2/17556* (2013.01)

(58) Field of Classification Search
CPC ...... B41J 2/175; B41J 2/17509; B41J 2/1752; B41J 2/17523; B41J 2/17556
See application file for complete search history.

(56) References Cited

U.S. PATENT DOCUMENTS

2002/0135638 A1* 9/2002 Okuda ................ B41J 2/14201 347/47

FOREIGN PATENT DOCUMENTS

JP H11-070666 A 3/1999
JP 2007268489 * 10/2007 ............. B01J 19/00

* cited by examiner

*Primary Examiner* — Anh T Vo
(74) *Attorney, Agent, or Firm* — WORKMAN NYDEGGER

(57) ABSTRACT

A liquid ejection device 1 includes an accommodation section 11 configured to accommodate ink 12; a head 17 configured to eject the ink 12; and a flow path 20 that connects the accommodation section 11 and the head 17 and inside which an elastic body 201 is movably enclosed, wherein the ink 12 is supplied from the accommodation section 11 to the head 17 via the flow path 20 and the elastic body 201 expands and contracts in accordance with pressure of the ink 12 inside the flow path 20.

10 Claims, 4 Drawing Sheets

LIQUID EJECTION DEVICE

The present application is based on, and claims priority from JP Application Serial Number 2023-031673, filed Mar. 2, 2023, the disclosure of which is hereby incorporated by reference herein in its entirety.

BACKGROUND

1. Technical Field

The present disclosure relates to a liquid ejection device.

2. Related Art

In the related art, there has been known a liquid ejection device in which a container such as a cartridge in which ink is accommodated and an inkjet head which ejects ink are connected to each other by a flow path such as a tube. For example, JP-A-11-70666 discloses an inkjet recording device in which a tube including a buffer tank and a compliance is arranged in a flow path between an ink cartridge and a recording head. The buffer tank and the tube described above have a function of alleviating volume fluctuation of ink in the recording head.

However, in the device described in JP-A-11-70666, there has been a problem that ink leakage is likely to occur in the flow path. Specifically, an ink inflow port and an ink outflow port of the buffer tank are connected to each other by tubes. By providing the buffer tank, the number of connection points of the flow path is increased, and there is the possibility that ink leakage easily occurs from the connection points. In other words, there has been a demand for a liquid ejection device that can both alleviate volume fluctuation of ink and suppress the occurrence of ink leakage in the flow path.

SUMMARY

A liquid ejection device includes an accommodation section configured to accommodate liquid; a head configured to eject the liquid; and a flow path that connects the accommodation section and the head and inside which an elastic body is movably enclosed, wherein the liquid is supplied from the accommodation section to the head via the flow path and the elastic body expands and contracts in accordance with pressure of the liquid inside the flow path.

DESCRIPTION OF EMBODIMENTS

In the embodiment described below, an inkjet printer and an ink ejection mechanism included in the inkjet printer as a liquid ejection device are exemplified. The inkjet printer performs printing by depositing liquid such as ink to a print medium such as paper. The liquid ejection device of the present disclosure may be operated together with other mechanisms included in the inkjet printer, such as a known transport mechanism for transporting the print medium.

In each of the following drawings, XYZ axes are provided as coordinate axes orthogonal to each other, and a direction indicated by each arrow is a + direction, and a direction opposite to the + direction is a − direction. The Z-axis is an imaginary axis along the vertical direction, and a +Z direction may be referred to as upward, and a −Z direction may be referred to as downward. In the following drawings, for convenience of illustration, the size of each member is different from the actual size.

Figure 1:
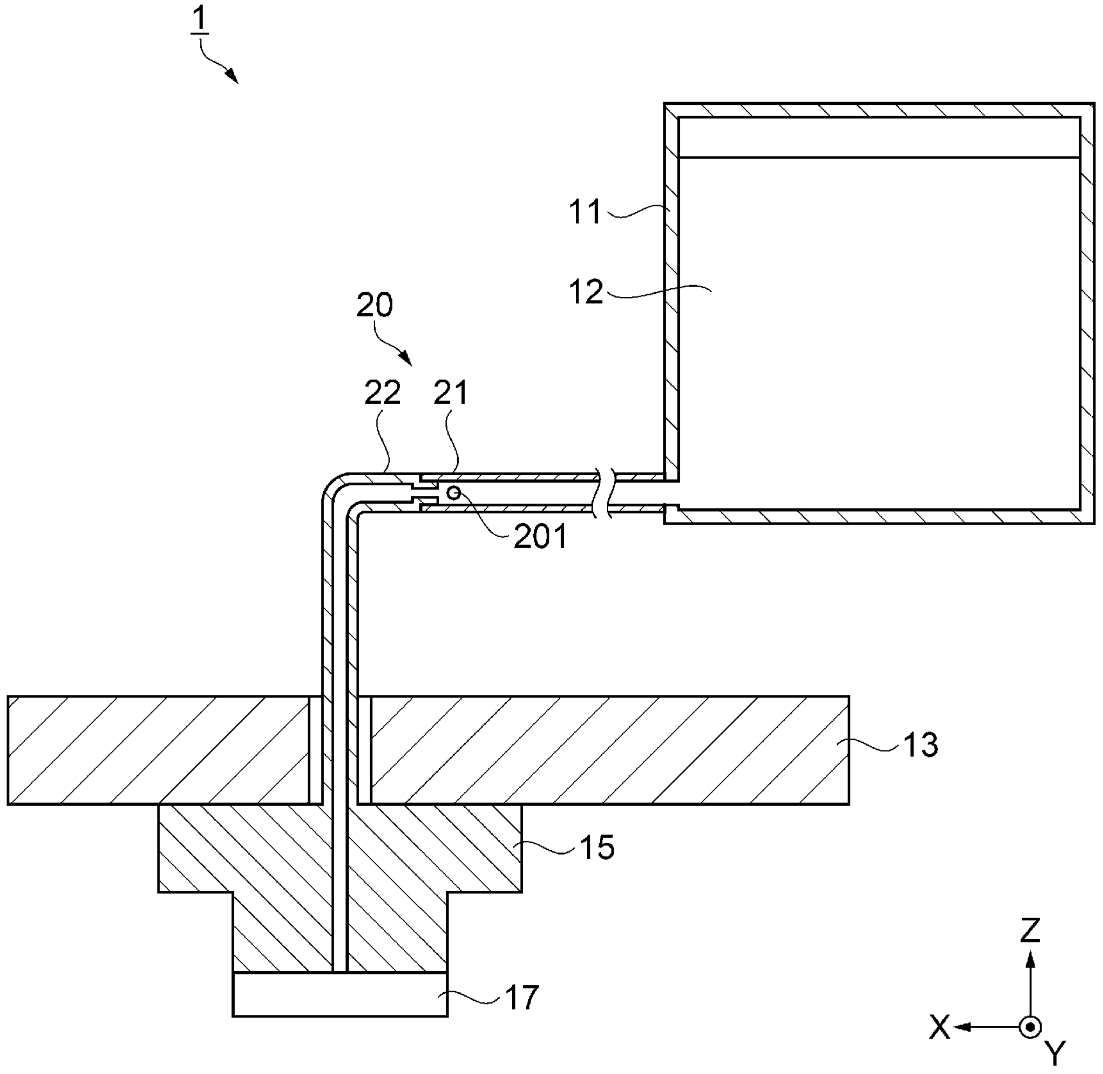
FIG. 1 is a schematic cross-sectional view showing a structure of a liquid ejection device according to an embodiment.

As shown in FIG. 1, a liquid ejection device 1 according to the present embodiment includes an accommodation section 11, a flow path 20, a carriage 13, a head holder 15, and a head 17. Although not shown, the liquid ejection device 1 also includes a control section that integrally controls the operation of each component of the inkjet printer including the head 17.

The control section includes a central processing unit (CPU), a system bus, a read only memory (ROM), a random access memory (RAM), and the like. The CPU performs overall control of the liquid ejection device 1. The CPU is electrically connected to the ROM, the RAM, and the components of the liquid ejection device 1 via the system bus. The ROM stores various control programs executed by the CPU, a maintenance sequence, and the like. The RAM temporarily stores data.

The accommodation section 11 accommodates ink 12 as liquid. A plurality of combinations of the accommodation section 11 and the flow path 20 may be provided for one head 17. Thus, a plurality of types of ink 12 can be deposited from the liquid ejection device 1 to the print medium.

Examples of the ink 12 include water-based ink using water as main solvent, solvent ink using solvent other than water as main solvent, and a reactive ink containing a monomer having reactivity such as ultraviolet curability. The ink 12 contains a color material and various additives in addition to solvent. The ink 12 may be a clear ink, a treatment liquid, or the like that does not contain a color material.

The liquid ejection device 1 is a so-called off carriage type in which the accommodation section 11 is not mounted on the carriage 13. The liquid ejection device of the present disclosure is not limited to the off carriage type, and the accommodation section 11 may be mounted on the carriage 13.

The flow path 20 penetrates the carriage 13 and the head holder 15, and connects and communicates the inside of the accommodation section 11 and the inside of the head 17. The ink 12 is supplied from the accommodation section 11 to the head 17 via the flow path 20. Here, in the flow path 20, an accommodation section 11 side is also referred to as upstream, and a head 17 side is also referred to as downstream. The ink 12 flows from upstream to downstream.

The flow path 20 includes a first flow path 21 and a second flow path 22. In the flow path 20, the first flow path 21 is arranged upstream, and the second flow path 22 is arranged downstream. An elastic body 201 is enclosed inside the flow path 20 so as to be movable upstream and downstream. The elastic body 201 is arranged in the first flow path 21 in the vicinity of the boundary between the first flow path 21 and the second flow path 22. Details of the elastic body 201 will be described later.

The flow path 20 is made of a known pipe material such as metal or resin. In the present embodiment, the flow path 20 including the first flow path 21 and the second flow path 22 is exemplified, but the present disclosure is not limited thereto. As long as the elastic body 201 is enclosed inside, the flow path 20 may be integrally formed.

The carriage 13 mounts the head 17 via the head holder 15. The carriage 13 is capable of reciprocating along a Y-axis by a movable mechanism (not shown).

In the present embodiment, a so-called serial type inkjet printer in which the carriage 13 moves with respect to a platen is exemplified, but the inkjet printer is not limited to this. The inkjet printer may be a line type in which the head 17 is arranged to be substantially equal to the width of the print medium along the Y-axis.

The head holder 15 is interposed between the carriage 13 and the head 17. An upper section of the head holder 15 is fixed to the carriage 13, and the head 17 is supported below the head holder 15.

The head 17 ejects the ink 12 onto the print medium. The head 17 is arranged below the carriage 13 via the head holder 15. Although not shown, when the liquid ejection device 1 is operated to deposit the ink 12 on the print medium, the print medium is arranged at a position corresponding to the platen below the head 17.

The print medium is moved in a direction along an X-axis by a transport mechanism (not shown). Therefore, by the movement of the carriage 13 in a direction along the Y-axis and the movement of the print medium in a direction along the X-axis, the head 17 can relatively move along an XY plane with respect to the print medium.

The head 17 includes a nozzle surface (not shown). The nozzle surface is arranged to face a platen in a direction along the Z-axis. A plurality of nozzles is arranged in a row on the nozzle surface. Droplets of the ink 12 are ejected from each nozzle. As described above, when a plurality of combinations of the accommodation sections 11 and the flow paths 20 are provided, a plurality of nozzle arrays corresponding to each ink 12 are arranged on the nozzle surface.

Although not shown, the head 17 includes an actuator which is a driving unit. The actuator causes the ink 12 to be ejected as a droplet from the nozzle by increasing or decreasing the volume of an ink chamber in which the ink 12 is stored. Examples of the actuator include a piezoelectric element using deformation of a piezoelectric body, an electromechanical conversion element using displacement of a diaphragm due to electrostatic adsorption, and an electrothermal conversion element using bubbles generated by heating. In the present embodiment, a piezoelectric element is used as the actuator.

Color printing can be performed by providing a plurality of combinations of the accommodation section 11 and the flow path 20 described above in accordance with the ink 12 exhibiting each color such as cyan, magenta, yellow, and black. Further, an image, a text, or the like is printed on the print medium by depositing each ink 12 on the print medium at a predetermined timing while relatively moving the head 17 along the XY plane with respect to the print medium.

Figure 2:
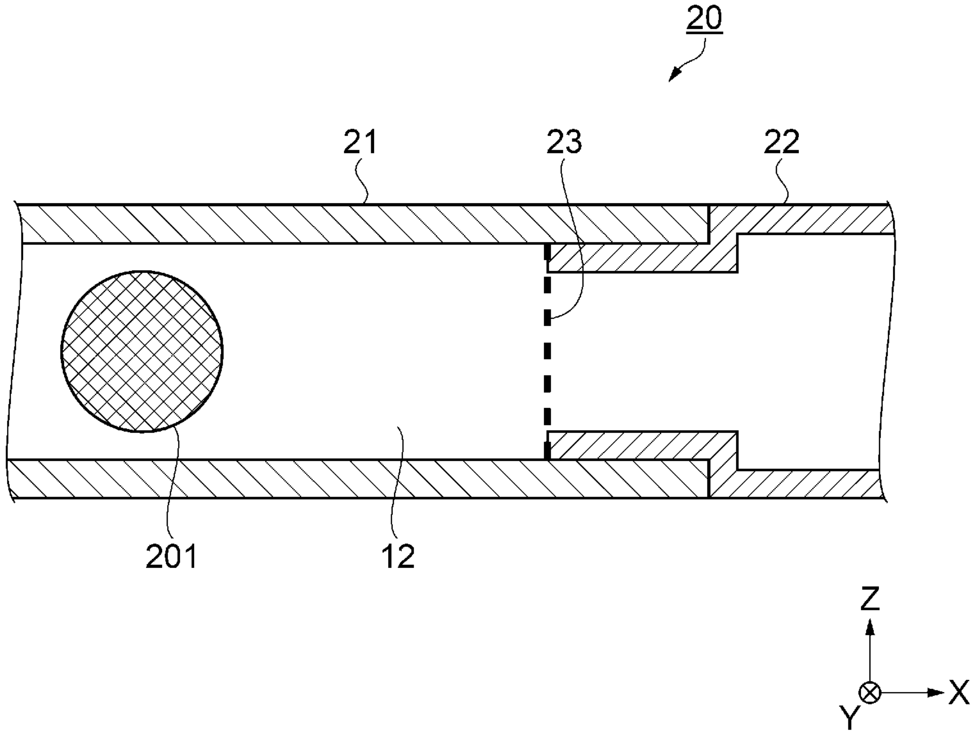
FIG. 2 is a schematic cross-sectional view of a region in a flow path in which an elastic body is enclosed.

As shown in FIG. 2, the elastic body 201 is enclosed in the first flow path 21. The first flow path 21 and the second flow path 22 are tubular members. In FIG. 2, as a region in which the elastic body 201 is enclosed, a region including a boundary between the first flow path 21 and the second flow path 22 is shown in an enlarged manner. In the above region, the flow path 20 is arranged along the X-axis. That is, in the above region, a −X direction is upstream and a +X direction is downstream.

In the above region, in other words, in the vicinity of the boundary between the first flow path 21 and the second flow path 22 of the flow path 20, the ink 12 flows in the +X direction. At this time, the normal line of a YZ plane is along the +X direction which is a flow direction of the ink 12, in other words, along the X-axis. The internal shape of cross-sectional sections along the YZ plane of the first flow path 21 and the second flow path 22 is circular. The first flow path 21 and the second flow path 22 are connected by a-X direction end section of the second flow path 22 entering a +X direction end section of the first flow path 21. The form of connection between the first flow path 21 and the second flow path 22 is not limited to the above.

A mesh member 23 is arranged at a tip end of the second flow path 22 in the −X direction. The mesh member 23 does not obstruct flow of the ink 12 in the flow path 20, and has a function of capturing the elastic body 201 and relatively large foreign substances without allowing them to flow into the second flow path 22. The mesh member 23 is made of a known mesh material such as metal or resin. For the purpose of retaining the elastic body 201 in the first flow path 21, the mesh member 23 may be omitted, and a convex section or the like may be provided in the vicinity of an end section of the first flow path 21 in the +X direction.

The elastic body 201 has a substantially spherical shape. The diameter of the elastic body 201 is smaller than the inner diameter of the first flow path 21. Although not particularly limited, for example, the diameter of the elastic body 201 is 2.0 mm, and the inner diameter of the first flow path 21 is 3.5 mm. The shape of the elastic body 201 is not limited to a substantially spherical shape, and may be a cubic shape, a columnar shape, or a three dimensional shape including an uneven surface.

The elastic body 201 may be floating in the ink 12 or may be in contact with an inner wall of the first flow path 21 as long as it can move in the first flow path 21.

The elastic body 201 expands and contracts in accordance with pressure of the ink 12 inside the flow path 20. Specifically, the elastic body 201 has a characteristic of expanding when hydraulic pressure of the ink 12 in the flow path 20 becomes negative pressure, and contracting when the hydraulic pressure becomes positive pressure. In the above hydraulic pressure, the hydraulic pressure at the boundary between positive pressure and negative pressure is, for example, −5.0 kPa.

Although the degree of expansion or contraction of the elastic body 201 is not limited, it is desirable that flow of the ink 12 is not stopped by closing the inside of the first flow path 21 when the elastic body expands. Examples of the elastic body 201 include foam such as a sponge, an elastomer such as rubber, and a hollow body in which fluid is contained. In the present embodiment, foam is used as the elastic body 201.

Figure 3:
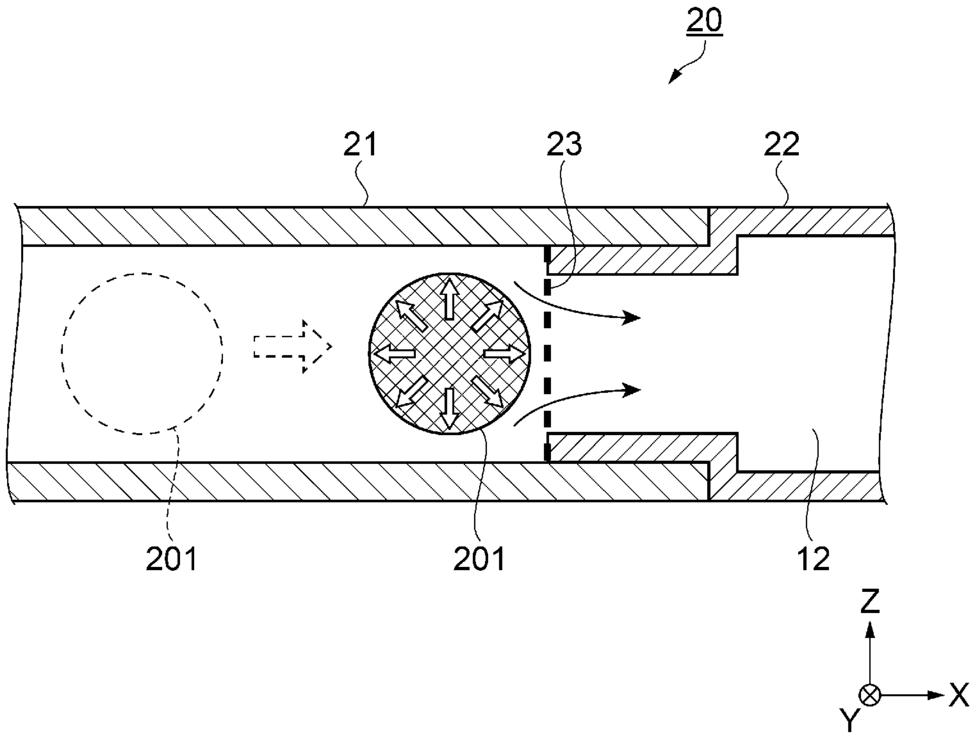
FIG. 3 is a schematic cross-sectional view showing a behavior of the elastic body.

As shown in FIG. 3, when hydraulic pressure of the ink 12 becomes negative pressure, the elastic body 201 moves downstream from the position indicated by broken line and expands. The elastic body 201 is captured by the mesh member 23 and stays in the first flow path 21, and the ink 12 flows downstream through the mesh member 23.

Here, changes in the hydraulic pressure of the ink 12 are caused by changes in ejection amount of the ink 12 in the head 17, evaporation of components of the ink 12 from an ink liquid surface of the nozzle, or the like. That is, when the volume of the ink 12 in the head 17 decreases, hydraulic pressure of the ink 12 in the head 17 and in the flow path 20 becomes a negative pressure. At this time, the volume of the elastic body 201 increases by expansion, so that the decrease in the volume of the ink 12 is reduced, and the negative pressure generated in the ink 12 is alleviated.

In particular, when the liquid ejection device 1 is not used for a long period of time, a volatile component of the ink 12 may evaporate from the nozzle of the head 17. At this time, in the related art, the volume of the ink 12 decreases due to evaporation of the volatile component of the ink 12, and air is easily drawn in from the nozzle. When the liquid ejection device 1 is restarted, air drawn into the nozzle may induce ejection failure of the ink 12.

On the other hand, in the liquid ejection device 1, the decrease in the volume of the ink 12 is alleviated by the expansion phenomenon of the elastic body 201. Therefore, air drawn into the nozzle is suppressed, and the occurrence of ejection failure of the ink 12 can be suppressed. That is, the liquid ejection device 1 can exhibit a buffering operation even with respect to gradual volume fluctuation of the ink 12 such as evaporation of an ink component.

Although not shown, when the volume of the ink 12 in the head 17 increases, hydraulic pressure of the ink 12 in the head 17 and the flow path 20 becomes positive pressure. At this time, the volume of the elastic body 201 is reduced by the contraction, so that the increase in the volume of the ink 12 is reduced, and the positive pressure generated in the ink 12 is alleviated.

Since the liquid ejection device 1 does not have a configuration in which a buffer tank or the like is added, the number of connection points of pipes in the flow path 20 is reduced compared to the configuration of the related art. Therefore, the possibility of ink leakage in the flow path 20 can be reduced.

Another configuration of the elastic body of the present disclosure will be described below. The same reference numerals are used for the same constituent parts as those in the above-described embodiment, and the duplicated description is omitted.

Figure 4:
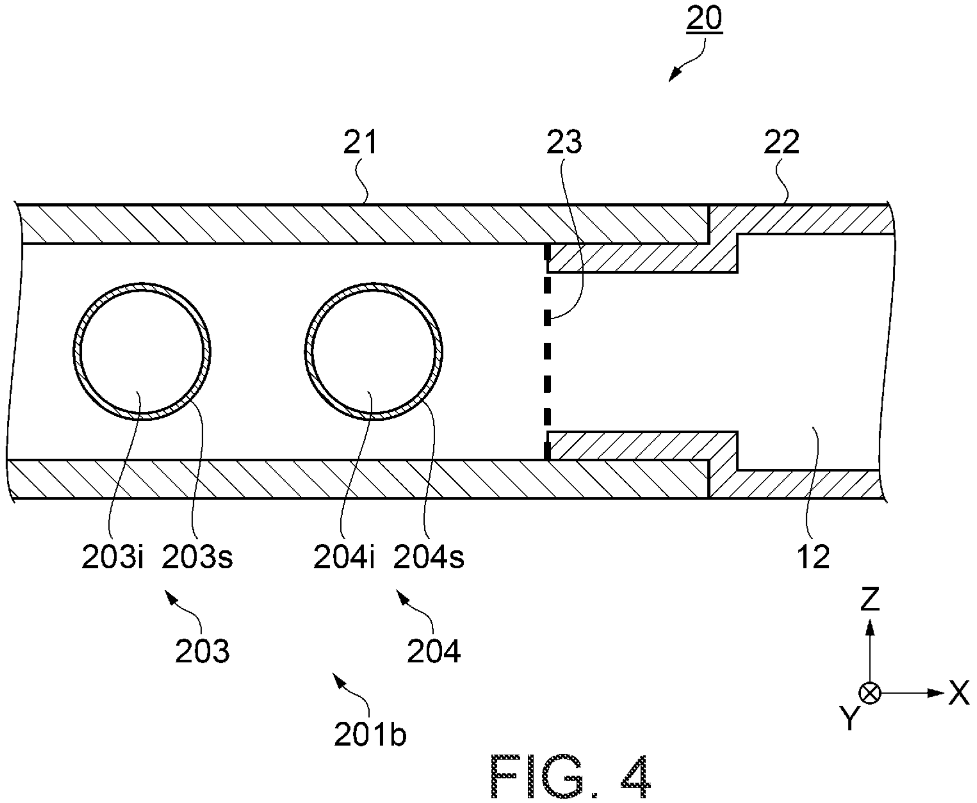
FIG. 4 is a schematic cross-sectional view showing another configuration of the elastic body.

As shown in FIG. 4, an elastic body 201*b* includes a first elastic body 203 and a second elastic body 204. The first elastic body 203 and the second elastic body 204 have the same volume.

In the elastic body 201*b*, the total volume change amount corresponding to volume fluctuation of the ink 12 is increased as compared with a case where one elastic body 201 is used. Therefore, larger volume fluctuation of the ink 12 can be alleviated. It is possible to reduce a flow path resistance of the ink 12 by reducing the size of each elastic body 201*b* and to reduce the size of the liquid ejection device 1 by reducing a cross-sectional area of the flow path 20. The number of the elastic bodies 201*b* is not limited to two.

The first elastic body 203 is a hollow member and includes an outer covering member 203*s*. A first fluid 203*i* is enclosed inside the outer covering member 203*s* of the first elastic body 203. The second elastic body 204 is a hollow member and includes an outer covering member 204*s*. A second fluid 204*i* is enclosed inside the outer covering member 204*s* of the second elastic body 204. As a material for forming the outer covering members 203*s* and 204*s*, for example, a known resin having flexibility is applied.

Desirably, the compression ratio of the first fluid 203*i* is different from the compression ratio of the second fluid 204*i*. According to this, the ease of expansion and the ease of contraction are different between the first fluid 203*i* and the second fluid 204*i*. Therefore, in addition to changing the timing of expansion or contraction with respect to volume fluctuation of the ink 12, it is possible to expand the range of volume fluctuation of the ink 12 that can be alleviated.

The first fluid 203*i* and the second fluid 204*i* are gases or liquids, and are desirably gases. As the elastic body 201*b*, a foam similar to the elastic body 201 may be applied. In this case, the first elastic body 203 and the second elastic body 204 may not be hollow members.

Figure 5:
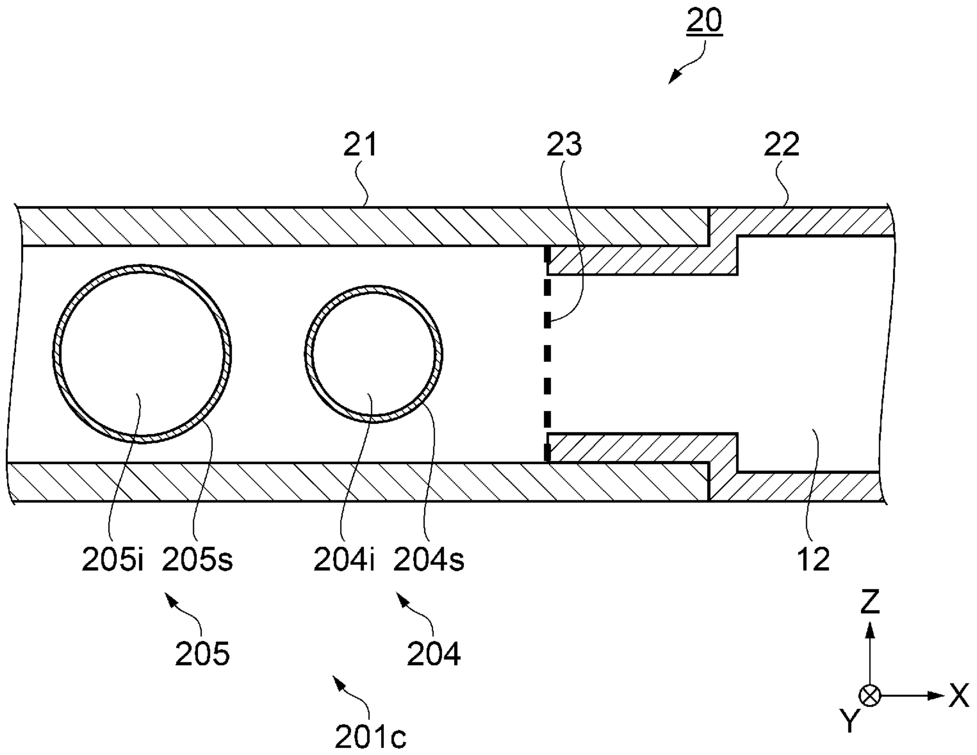
FIG. 5 is a schematic cross-sectional view showing another configuration of the elastic body.

As shown in FIG. 5, an elastic body 201*c* includes a first elastic body 205 and the above-described second elastic body 204. The volume of the first elastic body 205 is larger than the volume of the second elastic body 204.

The first elastic body 205 is a hollow member and includes an outer covering member 205*s*. A first fluid 205*i* is enclosed inside the outer covering member 205*s* of the first elastic body 205. As a material for forming the outer covering member 205*s*, for example, a known resin having flexibility is applied. The first fluid 205*i* and the second fluid 204*i* may be the same substance or different substances.

With the above configuration, the first elastic body 205 handles relatively large volume fluctuations in the ink 12, and the second elastic body 204 handles relatively small volume fluctuations in the ink 12. Therefore, in addition to changing the timing of expansion or contraction with respect to volume fluctuation of the ink 12, it is possible to expand the range of volume fluctuation of the ink 12 that can be alleviated.

Figure 6:
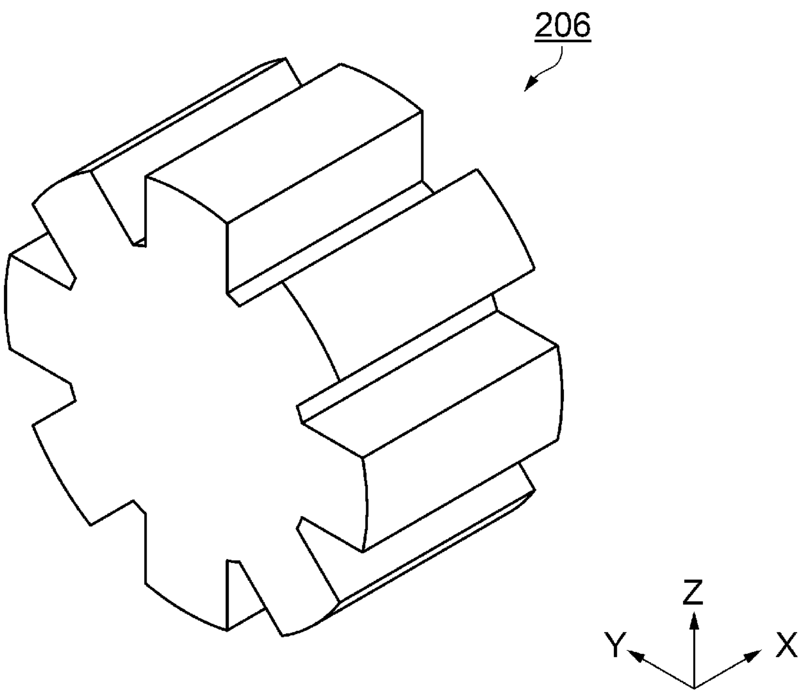
FIG. 6 is a perspective view showing another configuration of the elastic body.

As shown in FIG. 6, an elastic body 206 may be used instead of the above-described substantially spherical elastic body 201. An external shape of a cross-sectional section along the YZ plane of the elastic body 206 is different from an internal shape of a cross-sectional section along the YZ plane of the flow path 20, that is, is different from a circular shape.

The elastic body 206 has a cross-sectional shape along the YZ plane that is similar to a gear. The elastic body 206 has a columnar shape whose height direction is along the X-axis and whose bottom surface has a substantially gear shape. Since the external shape of the elastic body 206 is different from the internal shape of the flow path 20, particularly the first flow path 21, a gap is generated between the inside of the first flow path 21 and the elastic body 206. As a result, the ink 12 can be allowed to flow without closing the first flow path 21.

According to the present embodiment, the following effects can be obtained.

It is possible to achieve both alleviation of volume fluctuation of the ink 12 and suppression of the occurrence of ink leakage in the flow path 20. That is, it is possible to provide the liquid ejection device 1 which achieves both alleviation of volume fluctuation of the ink 12 and suppression of the occurrence of ink leakage in the flow path 20.

The following is a description of what can be derived from the embodiments.

A liquid ejection device includes an accommodation section configured to accommodate liquid; a head configured to eject the liquid; and a flow path that connects the accommodation section and the head and inside which an elastic body is movably enclosed, wherein the liquid is supplied from the accommodation section to the head via the flow path and the elastic body expands and contracts in accordance with pressure of the liquid inside the flow path.

According to this configuration, it is possible to achieve both alleviation of volume fluctuation of the liquid and suppression of the occurrence of liquid leakage in the flow path. Specifically, the elastic body expands or contracts in response to pressure of the liquid in the flow path, in other words, in response to volume fluctuation. When the volume of the liquid in the head and the flow path decreases, hydraulic pressure of the liquid changes to negative pressure, and the elastic body expands. This alleviates the decrease in the volume of the liquid.

When the volume of the liquid in the head and the flow path increases, hydraulic pressure of the liquid changes to positive pressure, and the elastic body contracts. This alleviates the increase in volume of the liquid. Furthermore, since the elastic body is enclosed in the flow path, the number of connection points of the flow path is reduced as compared with a case where a buffer tank is provided in the flow path. Therefore, it is possible to reduce possibility of liquid leakage in the flow path. As described above, it is possible to provide a liquid ejection device which achieves both alleviation of volume fluctuation of the liquid and suppression of the occurrence of liquid leakage in the flow path.

In the liquid ejection device described above, the elastic body includes a first elastic body and a second elastic body.

According to this configuration, since a plurality of elastic bodies are used, the total volume change amount of the elastic bodies corresponding to volume fluctuation of the liquid is increased as compared with a case where one elastic body is used. Therefore, this can alleviate a larger volume fluctuation of the liquid. It is possible to reduce a flow path resistance of the liquid by reducing the size of each elastic body and to reduce the size of the liquid ejection device by reducing a cross-sectional area of the flow path.

In the liquid ejection device described above, a first fluid is enclosed inside the first elastic body, a second fluid is enclosed inside the second elastic body, and a compression ratio of the first fluid is different from a compression ratio of the second fluid.

According to this configuration, the ease of expansion and the ease of contraction are different between the first elastic body and the second elastic body. Therefore, in addition to changing the timing of expansion or contraction with respect to volume fluctuation of the liquid, it is possible to expand the range of volume fluctuation of the liquid that can be alleviated.

In the liquid ejection device described above, a volume of the first elastic body is larger than a volume of the second elastic body.

According to this configuration, the first elastic body handles a relatively large volume fluctuation of the liquid, and the second elastic body handles a relatively small volume fluctuation of the liquid. Therefore, in addition to changing the timing of expansion or contraction with respect to volume fluctuation of the liquid, it is possible to expand the range of volume fluctuation of the liquid that can be alleviated.

In the liquid ejection device described above, with respect to a plane whose normal line is along a flow direction of the liquid in the flow path, an external shape of a cross-sectional section of the elastic body along the plane is different from an internal shape of a cross-sectional section of the flow path along the plane.

According to this configuration, since the shapes of the cross-sectional sections are different from each other, a gap is generated between the inside of the flow path and the elastic body. As a result, the liquid can be made to flow without closing the flow path.

What is claimed is:

1. A liquid ejection device comprising:
an accommodation section configured to accommodate liquid;
a head configured to eject the liquid; and
a flow path that connects the accommodation section and the head and inside which an elastic body is movably enclosed, wherein
the liquid is supplied from the accommodation section to the head via the flow path,
the elastic body expands and contracts in accordance with pressure of the liquid inside the flow path, and
with respect to a plane whose normal line is along a flow direction of the liquid in the flow path, an external shape of a cross-sectional section of the elastic body along the plane is different from an internal shape of a cross-sectional section of the flow path along the plane.

2. The liquid ejection device according to claim 1, wherein
the elastic body includes a first elastic body and a second elastic body.

3. The liquid ejection device according to claim 2, wherein
a first fluid is enclosed inside the first elastic body,
a second fluid is enclosed inside the second elastic body, and
a compression ratio of the first fluid is different from a compression ratio of the second fluid.

4. The liquid ejection device according to claim 2, wherein
a volume of the first elastic body is larger than a volume of the second elastic body.

5. A liquid ejection device comprising:
an accommodation section configured to accommodate liquid;
a head configured to eject the liquid; and
a flow path that connects the accommodation section and the head and inside which an elastic body is movably enclosed, wherein
the liquid is supplied from the accommodation section to the head via the flow path,
the elastic body expands and contracts in accordance with pressure of the liquid inside the flow path, the elastic body includes a first elastic body and a second elastic body,
a first fluid is enclosed inside the first elastic body,
a second fluid is enclosed inside the second elastic body, and
a compression ratio of the first fluid is different from a compression ratio of the second fluid.

6. The liquid ejection device according to claim 5, wherein
a volume of the first elastic body is larger than a volume of the second elastic body.

7. The liquid ejection device according to claim 5, wherein
with respect to a plane whose normal line is along a flow direction of the liquid in the flow path, an external shape of a cross-sectional section of the elastic body along the plane is different from an internal shape of a cross-sectional section of the flow path along the plane.

8. A liquid ejection device comprising:
an accommodation section configured to accommodate liquid;
a head configured to eject the liquid; and
a flow path that connects the accommodation section and the head and inside which an elastic body is movably enclosed, wherein
the liquid is supplied from the accommodation section to the head via the flow path,
the elastic body expands and contracts in accordance with pressure of the liquid inside the flow path, the elastic body includes a first elastic body and a second elastic body, and a volume of the first elastic body is larger than a volume of the second elastic body.

9. The liquid ejection device according to claim 8, wherein a first fluid is enclosed inside the first elastic body, a second fluid is enclosed inside the second elastic body, and a compression ratio of the first fluid is different from a compression ratio of the second fluid.

10. The liquid ejection device according to claim 8, wherein with respect to a plane whose normal line is along a flow direction of the liquid in the flow path, an external shape of a cross-sectional section of the elastic body along the plane is different from an internal shape of a cross-sectional section of the flow path along the plane.

* * * * *